Figure 1:
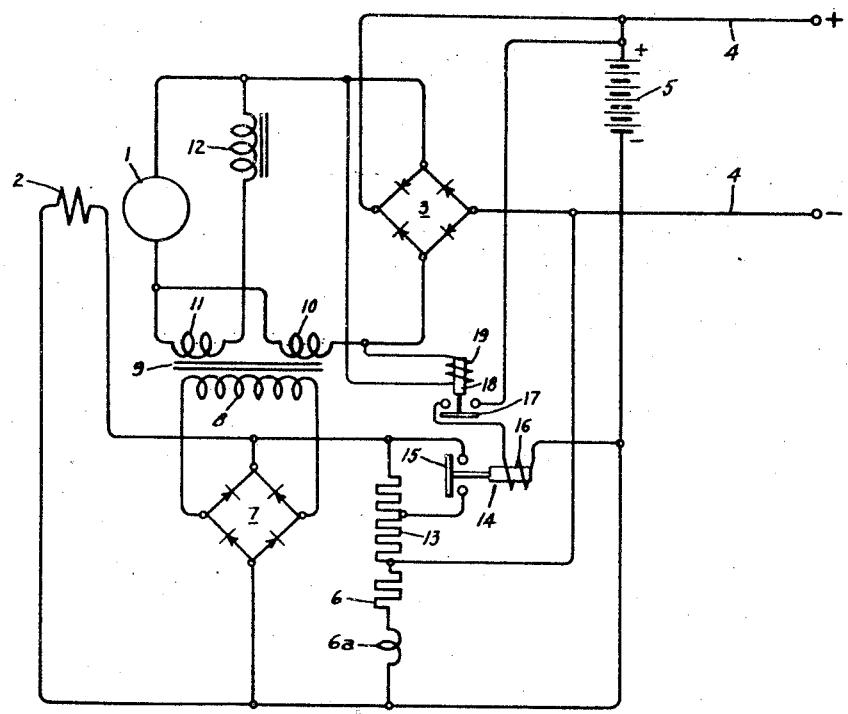

June 3, 1947.　　　W. PARTINGTON　　　2,421,645
REGULATING SYSTEM
Filed May 29, 1945　　　2 Sheets-Sheet 1

Inventor:
Walter Partington,
by Harry E. Dunham
His Attorney.

Patented June 3, 1947

2,421,645

UNITED STATES PATENT OFFICE 2,421,645

REGULATING SYSTEM

Walter Partington, Sheffield, England, assignor to Metropolitan-Vickers Electrical Company Limited, London, England, a company of Great Britain Application May 29, 1945, Serial No. 596,477
In Great Britain June 14, 1944

10 Claims. (Cl. 320—32)

My invention relates to dynamoelectric machines and to regulating systems therefor, and is particularly concerned with generators of the axle-driven type for use in connection with a storage battery adapted to provide current for lighting or other auxiliary equipment in railway locomotives or coaches or other vehicles.

In such vehicle lighting and battery charging systems, the speed of the axle-driven generator is variable over a wide range. Ordinarily, therefore, the system is so arranged that the battery supplies the load current when the vehicle is stationary or driven at low speed, while the generator supplies the load current and also charging current for the battery when the vehicle is operating above a predetermined minimum speed. Furthermore, above such minimum speed the generator is required to produce a substantially constant voltage in spite of variations in speed over a considerable range.

It is therefore a general object of my invention to provide a dynamoelectric generator with new and improved regulating arrangements for the above purpose in which the generator and regulating arrangements are of robust construction without replaceable parts requiring maintenance, such as brush gear voltage regulators and the like.

According to the present invention, there are provided for the purpose set forth, an axle-driven generator for lighting and other auxiliary purposes in a railway locomotive or coach or other vehicle, and a generating arrangement in which the generator is an alternating current machine and has its output terminals connected with a rectifier, conveniently of the dry plate type. The output terminals of the rectifier are connected with a storage battery and a load and the alternator is provided with exciting means adapted to be energized by current supplied from the alternator by way of additional rectifying means which may also conveniently be of the dry plate type, the field exciting rectifier providing two excitation components. One component of excitation is dependent upon the output current supplied from the alternator through the first-mentioned rectifier to the load, and the other component is dependent upon the voltage produced by the alternator and is derived through or under control of inductive means causing the corresponding component in the alternator excitation to vary inversely with the frequency of the alternator. Means are also provided for producing in the resultant excitation of the alternator a further or third component which is dependent upon and varies in the same sense as the current supplied from the first-mentioned rectifier to the battery and which acts in such a direction as to oppose the two excitation components derived directly from the alternator.

In a system according to the invention, the resultant excitation of the alternator is proportional to $$\sqrt{\left(K_1\frac{E}{N}\right)^2 + (K_2 I)^2} - K_3(E-B)$$

where E is the alternator voltage, I is the alternator load current applied to the storage battery and load by way of the first-mentioned rectifier, N is the speed of the alternator and is therefore proportional to the frequency of the latter, B is battery voltage, and $K_1$, $K_2$, and $K_3$ are constants.

By appropriate selection of the circuit parameters, the resultant excitation produced on the alternator can be caused to assume, for all speeds and output currents of the alternator within the operative range of the latter, approximately the value required by the alternator to maintain the appropriate voltage at the load terminals, so that a relatively small additional control of the alternator excitation will be sufficient for stabilizing the voltage. Such additional control is provided by the third excitation component opposing the first and second components during charging of the battery, the output voltage of the alternator applied to the storage battery and the load being thereby regulated to a value slightly in excess of the battery voltage. Thus, if the alternator voltage rises above the desired value, the battery current rises and the resultant excitation is reduced. The first and second excitation components alone will not provide complete regulation of the alternator voltage to a constant value over the required speed range due to hysteresis effect and variation of magnetic saturation with vehicle speed.

The magnitude of the third excitation component may be increased under control of the voltage of the battery so as to reduce the alternator excitation when the battery voltage rises to a value corresponding with gassing of the battery.

Figure 2:
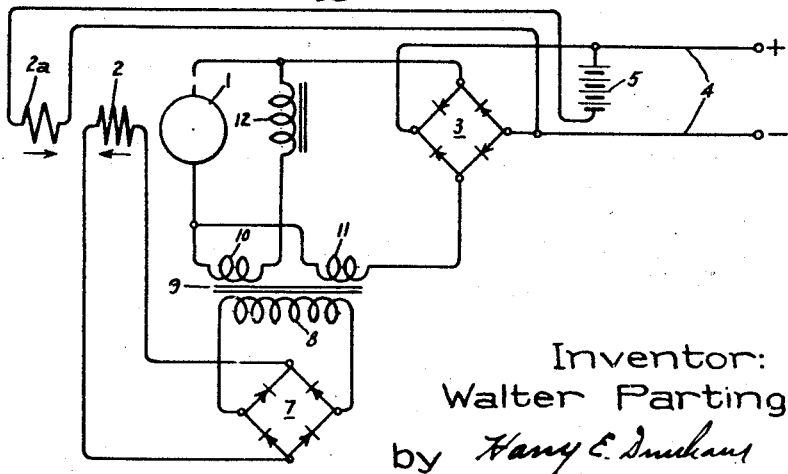
Figure 3:
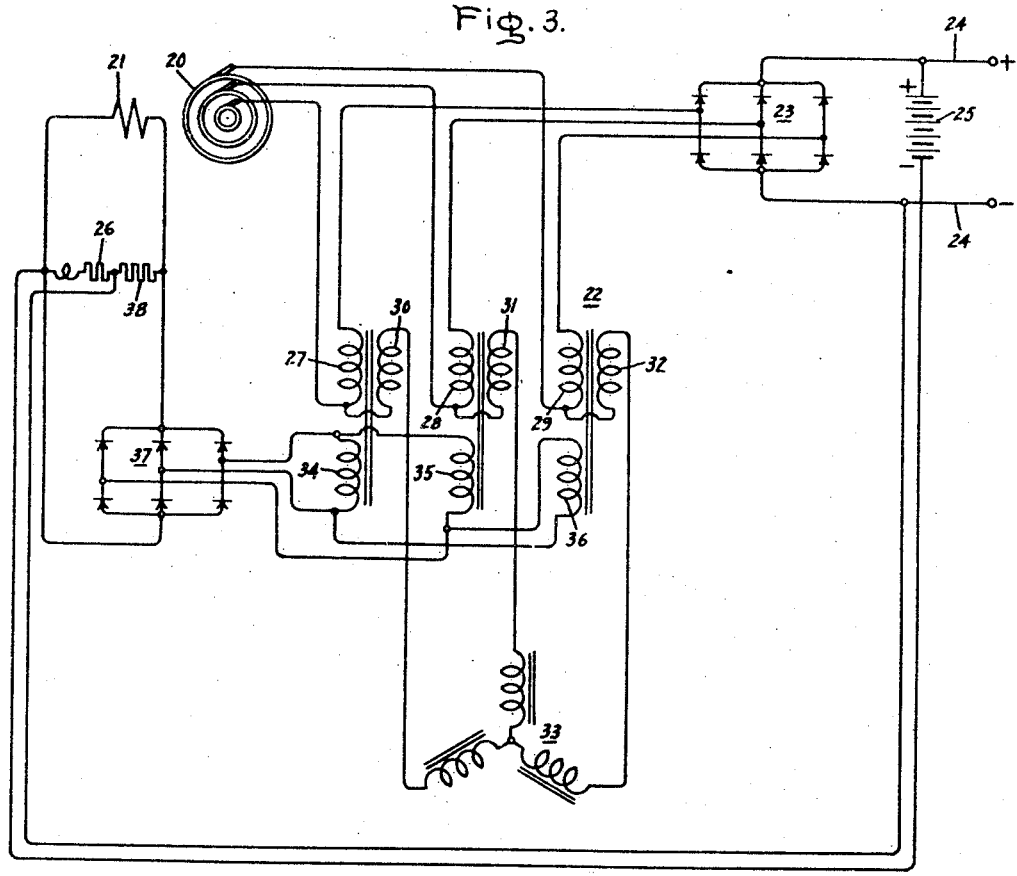

My invention itself will be more fully understood and its various objects and advantages further appreciated by referring now to the following detailed specification taken in conjunction with the accompanying drawings in which Figs. 1, 2, and 3 are schematic circuit diagrams of various dynamoelectric machine regulating systems embodying my invention.

Referring now to the drawings, and particularly to Fig. 1, I have shown an alternator 1 having a field exciting winding 2 and an armature circuit connected to supply alternating current to a full wave rectifier 3. The alternator 1 is driven at variable speed by connection to the axle (not shown) of a railway locomotive, coach, or the like. The direct current terminals of the full wave rectifier 3 are connected to line conductors 4 adapted to be connected to a suitable load circuit which may comprise vehicle lights and other auxiliary apparatus. A battery 5 is connected in voltage opposition across the line conductors 4 in series with an inductive resistor 6, the inductance of the resistor 6 being represented on the drawing by an inductor 6a.

The alternator field exciting winding 2 is energized directly in accordance with the current and voltage and inversely in accordance with the speed of the alternator through a full wave rectifier 7 having its input terminals connected to the secondary winding 8 of a transformer 9 associated with the armature circuit of the alternator. The transformer 9 is provided with a pair of primary windings 10 and 11. The primary winding 10 is connected in series circuit relation between the alternator armature and the rectifier 3, so that the current in the winding 10 is proportional to the alternator load current. The primary winding 11 is connected in series with an inductor 12 across the armature terminals of the alternator, so that the current in the winding 11 is directly proportional to alternator voltage and inversely proportional to alternator speed or frequency. It will be understood that the frequency or speed response is introduced by the inductive reactance of the reactor 12, which is directly proportional to frequency.

In order to limit the battery charging current, the resistor 6 is connected in series circuit relation with a resistor 13 across the direct current output terminals of the field energizing rectifier 7. The series connected resistors 6 and 13 are thus connected in parallel circuit relation with the field exciting winding 2 across the output terminals of the rectifier 7. The resistor 6 is so connected in this circuit that the battery charging current through the resistor 6 opposes the flow of current from the output terminals of the rectifier 7 through the resistors 6 and 13 in series.

To further prevent overcharging of the battery to its gassing point, a gassing relay 14 having a normally open contact 15 is connected to shunt a portion of the resistor 13 whenever the battery voltage attains a predetermined maximum value. For this purpose, an actuating winding 16 of the relay 14 is connected across the battery terminals in series with a normally open contact 17 of a voltage relay 18. The relay 18 is provided with an actuating winding 19 connected across the alternating current input terminals of the load rectifier 3 and serves to prevent discharge of the battery 5 through the gassing relay winding 16 at low vehicle speeds and standstill.

In operation, the regulating system described above by its component parts maintains substantially constant the given directional voltage between the line conductors 4 without necessary recourse to any element having moving parts. When the vehicle is at standstill, the load connected between the line conductors 4 is supplied by the battery 5. Since the alternator 1 is not rotating, its output current and voltage are zero so that the field exciting winding 2 is not energized. The winding 2 is not energized from the battery because the load rectifier 3 prevents flow of any current from the battery 5 through the resistor 6. It will be understood that the rectifier 3 also prevents battery discharge through the alternator armature when the vehicle is at standstill or the alternator voltage otherwise insufficient to supply current to the battery and load.

As the vehicle is set in motion and its speed increases, the energization of the field exciting winding 2 increases directly in proportion to alternator output voltage by reason of the shunt connection of the transformer winding 11. An inverse function of alternator speed is introduced into the shunt excitation by the action of the frequency responsive inductor 12, which is connected in series circuit relation with the winding 11 and arranged to be magnetically unsaturated over the entire range of working conditions. At normal running speed, the reactor 12 effects a considerable portion of the voltage regulation by decreasing the alternator excitation when the speed increases and increasing the alternator excitation when the vehicle speed decreases.

Load compensation is effected by the action of the current responsive primary winding 10. Thus, when a heavy load current is drawn, the primary winding 10 increases the transformer secondary voltage and thereby increases the alternator excitation and, conversely, at light loads the alternator excitation is decreased by the action of the winding 10. In this way, variation of the alternator voltage with load current is minimized. Due to the reactor 12 the shunt component of excitation is substantially in quadrature with the alternator terminal voltage, while the current component from the winding 10 is substantially in phase with the output current, whereby the alternator voltage is regulated to a substantially constant value irrespectively both of the output current and the vehicle speed.

The battery current traversing the resistor 6 introduces into the alternator excitation a function of the difference between battery voltage and the output voltage of the load rectifier 3, thereby to limit the battery charging current at high vehicle speeds. This action may be understood by first considering the effect of the resistors 6 and 13 without the passage of battery current through the resistor 6. It will be observed that these resistors are connected in shunt circuit relation with the alternator field exciting winding 2 across the output terminals of the field rectifier 7, thereby to shunt a certain portion of the rectifier output current from the field winding. In accordance with my invention, the portion of current so shunted is controlled by the magnitude of battery current traversing the resistor 6. As pointed out hereinbefore, only battery charging current can traverse the resistor 6 by reason of the fact that discharge of the battery through the resistor 6 is prevented by the load rectifier 3. Moreover, the battery current passes through the resistor 6 in opposition to the current supplied to the resistor 6 from the field rectifier 7. Thus, when the battery charging current is large, that is, when the battery voltage is considerably below the machine voltage, the bucking effect of the battery current in the shunt circuit through the resistors 13 and 6 is relatively large, so that a relatively small amount of current is shunted away from the field exciting winding 2. As the battery voltage increases indicating that the battery is approaching its fully charged condition, the battery charging current diminishes in amplitude so that its bucking effect in the field rectifier shunt circuit is decreased. Accordingly, therefore, the effective resistance of the field rectifier shunt circuit through the resistors 6 and 13 is decreased and a greater proportion of the field current is shunted away from the field exciting winding 2, thereby to decrease the alternator excitation and limit the battery charging action.

The battery 5 is further protected against overcharging by the gassing switch 14. The switch 14 is actuated directly in response to battery voltage and is arranged to be picked up to shunt a portion of the resistor 13 whenever the battery voltage attains a predetermined maximum desired value slightly less than its gassing voltage. It will be understood that by shunting a portion of the resistor 13, the resistance of the field rectifier shunt circuit is diminished, thereby to decrease the energization of the field exciting winding 2. The circuit of the actuating winding 16 of the gassing switch 14 is closed through a normally open voltage responsive relay 18 which is arranged to be open when the vehicle is at standstill or operating at low speeds and to be picked up only above a predetermined minimum speed. The relay 18 prevents discharge of the battery 5 through the relay actuating winding 16 when the vehicle is at standstill or operating at low speeds.

If desired, the differential function of line and battery voltage may be introduced into the alternator excitation by a separate field exciting winding connected directly in series circuit relation between the output terminals of the load rectifier 3 and the battery 5. At Fig. 2, I have illustrated such an embodiment of my invention wherein a field exciting winding 2a arranged to carry battery charging current and to establish a flux in opposition to the flux of the field exciting winding 2 is connected between one of the line conductors 4 and the terminal of like polarity of the battery 5. In all other respects, the system shown at Fig. 2 is similar to that shown at Fig. 1 and like parts have been assigned like reference numerals. By way of illustration, however, I have omitted at Fig. 2 the gassing switch 14 and its control switch 18, since the system is entirely operative without these additional battery protecting elements.

It will of course be understood that, if desired, a polyphase dynamoelectric machine may be employed. Polyphase machines have the advantage of reducing the fluctuation of current through the load. Preferably, in the case of a polyphase machine, the excitation is derived from a polyphase transformer arrangement supplying the exciting winding of the alternator from the several phases of the machine in accordance with the current and voltage of the latter and under the control of the polyphase choke coil.

At Fig. 3, I have shown such an embodiment of my invention wherein a three-phase alternator 20 having a field exciting winding 21 is connected through a polyphase transformer 22 to a polyphase load rectifier 23. The output terminals of the load rectifier 23 are connected to a pair of direct current line conductors 24 arranged to supply a suitable load circuit. A battery 25 is connected between the line conductors 24 in series with a resistor 26 in the field circuit of the alternator 20. The polyphase transformer 22 includes three current responsive primary windings 27, 28, and 29 connected in series circuit relation between the alternator output terminals and the rectifier 23. Three additional primary windings 30, 31, and 32 of the polyphase transformer 22 are connected for response directly in accordance with alternator voltage and inversely in accordance with alternator frequency by connection from the alternator output terminals to the legs of an unsaturated polyphase reactor 33.

The polyphase transformer 22 includes also three secondary windings 34, 35, and 36 connected in delta and to the input of a polyphase field rectifier 37. The output terminals of the field rectifier 37 are connected directly to the terminals of the field exciting winding 21. A resistor 38 is connected in series circuit relation with the resistor 26 across the output terminals of the field rectifier 37 in the manner of the resistor 13 of Fig. 1.

It is believed that the operation of the system shown at Fig. 3 will be fully understood from the foregoing description of Fig. 1. Briefly, the transformer 22 provides exciting current for the alternator varying in the manner hereinbefore described directly with alternator voltage and current and inversely with alternator speed. The polyphase choke coil 33 functions in the manner of the choke coil 12 of Fig. 1, so that the shunt connected transformer primary windings 30, 31, and 32 provide regulation in accordance with alternator speed. Similarly, the current responsive transformer windings 27, 28, and 29 provide load compensation in the machine excitation, while the resistor 26 introduces a differential function of machine and battery voltage into the machine excitation to limit the charging current.

While I have described only certain preferred embodiments of my invention by way of illustration, many further modifications will occur to those skilled in the art and I, therefore, wish to have it understood that I intend in the appended claims to cover all such modifications as fall within the true spirit and scope of my invention.

What I claim as new and desire to secure by Letters Patent of the United States is:

1. In combination, a variable speed alternating current dynamoelectric machine having an armature circuit and a field exciting winding, means including a reactor associated with said armature circuit and connected effectively in series circuit relation with said field exciting winding for energizing said winding inversely in accordance with the speed of said machine, and regulating means including a battery and arranged to reduce the energization of said field exciting winding directly in accordance with the voltage difference between said machine and said battery.

2. In combination, a variable speed dynamoelectric machine having an armature circuit and a field exciting winding, a battery, rectifying means associated with said armature circuit and connected to charge said battery, shunt excited means including second rectifying means and an effectively series connected reactor associated with said armature circuit for energizing said field exciting winding directly in accordance with the voltage and inversely in accordance with the frequency of said armature circuit, and means differentially responsive to the output voltage of said first rectifying means and said battery for opposing the shunt excitation of said machine.

3. In combination, a variable speed alternating current dynamoelectric machine having an armature circuit and a field exciting winding, rectifying means associated with said armature circuit and arranged to energize said field exciting winding inversely in accordance with the speed of said machine, a battery, second rectifying means associated with said armature circuit and connected to charge said battery, and means differentially responsive to the voltage of said battery and the output of said second rectifying means for controlling the excitation of said machine.

4. In combination, a variable speed alternating current dynamoelectric machine having an armature circuit and a field exciting winding, shunt excited rectifying means associated with said armature circuit and including an effectively series connected frequency responsive reactor for energizing said field exciting winding inversely in accordance with the speed of said machine, a battery, series excited rectifying means associated with said armature circuit for energizing said field exciting winding directly in accordance with load current, additional rectifying means connected to said armature circuit and arranged to charge said battery, and means for reducing the excitation of said machine directly in proportion to the intensity of battery charging current.

5. In combination, a variable speed alternating current dynamoelectric machine having an armature circuit and a field exciting winding, rectifying means associated with said armature circuit and having output terminals arranged to supply current to a load circuit, rectifying means associated with said armature circuit for energizing said field exciting winding, frequency responsive impedance means connected to control the input to said rectifying means inversely in accordance with the speed of said machine, second impedance means arranged to control the output of said rectifying means, and means differentially responsive to the voltage of said battery and the voltage across the load circuit for controlling the effective impedance of said second impedance means.

6. In combination, a variable speed alternating current dynamoelectric machine having an armature circuit and a field exciting winding, rectifying means associated with said armature circuit and having output terminals connected to supply energizing current to said field exciting winding, means including a frequency responsive reactor coupled to said armature circuit for energizing said rectifying means inversely in accordance with the speed of said machine, impedance means connected in parallel circuit relation with said field exciting winding, second rectifying means associated with said armature circuit and having output terminals arranged to supply current to a load circuit, a battery, and means for controlling the effective impedance of said impedance means directly in accordance with the difference between the voltage of said battery and the voltage applied to said load circuit.

7. In combination, a variable speed dynamoelectric machine having an armature circuit and a field exciting winding, means for rectifying the current in said armature circuit to supply direct current to an electrical load, a battery connected also to supply current to said load and to be charged from said machine, means associated with said armature circuit for energizing said field exciting winding, frequency responsive means coupled to said armature circuit for varying the energization of said winding inversely in accordance with the speed of said machine, armature current responsive means for varying the excitation of said machine to compensate for load changes, and means for varying the excitation of said machine directly in accordance with the difference of load and battery voltage to limit the charging current supplied to said battery.

8. In combination, a variable speed dynamoelectric machine having an armature circuit and a field exciting winding, means for rectifying the current in said armature circuit to supply direct current to an electrical load, a battery connected also to supply current to said load and to be charged from said machine, second rectifying means associated with said armature circuit for energizing said field exciting winding, shunt excited means including an effectively series connected reactor for varying the input to said second rectifying means inversely in accordance with the speed of said machine and directly in accordance with the voltage of said armature circuit, load compensating armature current responsive means for varying the input to said second rectifying means directly in accordance with armature current, and means differentially responsive to the voltage of said battery and the voltage across said load circuit for varying the energization of said field exciting winding directly in accordance with the intensity of charging current supplied to said battery.

9. In combination, a variable speed dynamoelectric machine having an armature circuit and a field exciting winding, means for rectifying the current in said armature circuit to supply direct current to a load circuit, a battery connected also to supply current to and to be charged from said load circuit, second rectifying means associated with said armature circuit for supplying energizing current for said field exciting winding, a transformer having a secondary winding connected to the input of said second rectifying means and a pair of primary windings, one of said primary windings being connected across the armature terminals of said machine in series circuit relation with a frequency responsive impedance and the other of said primary windings being connected in series with said armature circuit, a resistor connected across the output of said second rectifying means, and means differentially responsive to load and battery voltage for reducing the effective resistance of said resistor as battery charging current decreases.

10. In combination, a variable speed dynamoelectric machine having an armature circuit and a field exciting winding, means for rectifying the current in said armature circuit to supply direct current to a load circuit, a battery connected also to supply current to and to be charged from said load circuit, second rectifying means associated with said armature circuit for supplying energizing current to said field exciting winding, a transformer having a secondary winding connected to the input of said second rectifying means and a pair of primary windings, one of said primary windings being connected across said armature circuit in series circuit relation with an unsaturated choke coil and the other of said primary windings being connected in series circuit relation in said armature circuit, a resistor connected across the output of said second rectifying means in parallel circuit relation with said field exciting winding, and means connecting a portion of said resistor in series circuit relation with said battery across said load so that battery charging current in said resistor opposes current from said second rectifying means.

WALTER PARTINGTON.

REFERENCES CITED

The following references are of record in the file of this patent:

UNITED STATES PATENTS

| Number | Name | Date |
|---|---|---|
| 1,790,691 | Zierdt | Feb. 3, 1931 |
| 1,837,738 | Vencill | Dec. 22, 1931 |
| 1,865,595 | Spangler | July 5, 1932 |
| 1,876,548 | Atherton | Sept. 13, 1932 |
| 1,993,914 | Bohm | Mar. 12, 1935 |
| 2,139,330 | Gilson | Dec. 6, 1938 |
| 2,155,515 | Trucksess | Apr. 25, 1939 |

FOREIGN PATENTS

| Number | Country | Date |
|---|---|---|
| 439,955 | Great Britain | Dec. 13, 1935 |
| 441,192 | Great Britain | Jan. 13, 1936 |